United States Patent
Potente

[11] Patent Number: 6,024,048
[45] Date of Patent: Feb. 15, 2000

[54] POLE SLEEVE

[76] Inventor: John E Potente, 659 Wheeler Rd., Hauppauge, N.Y. 11788

[21] Appl. No.: 09/067,884

[22] Filed: Apr. 28, 1998

[51] Int. Cl.[7] .................................................. A01K 31/14
[52] U.S. Cl. .......................... 119/57.9; 119/52.3; 47/23; 52/101
[58] Field of Search ................... 119/57.9, 52.3, 119/59; 52/101; 47/23, 24, 25

[56] References Cited

U.S. PATENT DOCUMENTS

| | | | |
|---|---|---|---|
| 203,898 | 5/1878 | Doak | 47/23 |
| 404,757 | 6/1889 | Webber | 47/23 |
| 464,879 | 12/1891 | Knapp | 47/23 |
| 574,998 | 1/1897 | Kent et al. | 47/23 |
| 1,075,255 | 10/1913 | Helm | 47/23 |
| 1,673,729 | 6/1928 | Barnes | 52/170 |
| 1,879,813 | 9/1932 | Molitor | 47/23 |
| 3,826,040 | 7/1974 | Roberts et al. | 47/30 |
| 4,031,856 | 6/1977 | Chester | 119/57.9 |
| 4,259,927 | 4/1981 | Clarke | 119/57.9 |
| 4,700,507 | 10/1987 | Allen | 47/23 |
| 4,765,277 | 8/1988 | Bailey et al. | 119/51 R |
| 4,845,889 | 7/1989 | Taylor | 47/23 |
| 4,899,486 | 2/1990 | Hurlstone | 47/30 |
| 4,922,652 | 5/1990 | Graves | 47/23 |
| 4,986,219 | 1/1991 | Harris | 119/57 |
| 5,003,734 | 4/1991 | Dinsmore | 52/101 |
| 5,060,416 | 10/1991 | Rohde | 47/23 |
| 5,195,460 | 3/1993 | Loken | 119/57.9 |
| 5,207,180 | 5/1993 | Graham | 119/52.3 |
| 5,285,748 | 2/1994 | Weldin | 119/57.9 |
| 5,289,796 | 3/1994 | Armstrong | 119/52.3 |
| 5,291,855 | 3/1994 | Laverty | 119/52.3 |
| 5,295,455 | 3/1994 | Johnson | 119/57.9 |
| 5,345,711 | 9/1994 | Friesner | 47/24 |
| 5,394,641 | 3/1995 | Danca | 43/124 |
| 5,581,935 | 12/1996 | Anderson | 47/23 |
| 5,782,041 | 7/1998 | Filipescu | 52/101 |
| 5,867,953 | 2/1999 | Amundsen | 52/170 |
| 5,878,537 | 3/1999 | Flischel | 52/101 |

*Primary Examiner*—Michael J. Carone
*Assistant Examiner*—James S. Bergin
*Attorney, Agent, or Firm*—Alfred M. Walker

[57] ABSTRACT

The invention comprises a flexible sheet of material that is formed into a cylindrical shape thus acquiring with it an internal spring tension. The device may be placed as a sleeve over a pole or post thus serving to dislodge climbing animals when they look to ascend the device by compressing it along its length and in turn receiving an equal and opposite force of instant recoil.

1 Claim, 2 Drawing Sheets

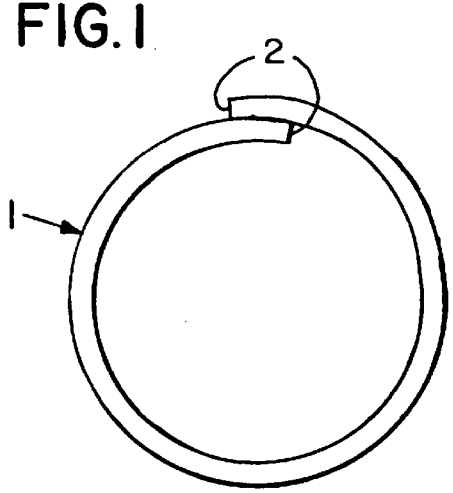
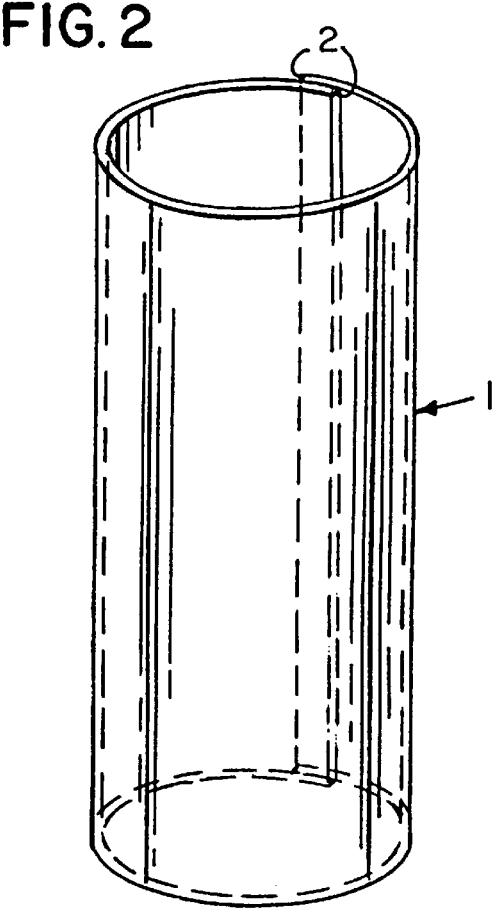
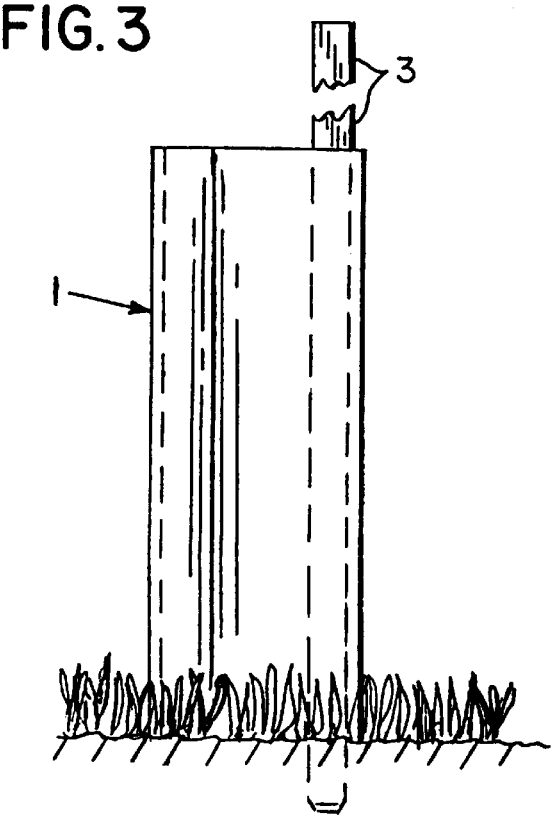
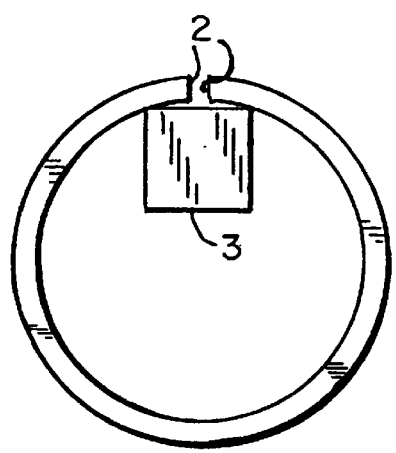

U.S. Patent     Feb. 15, 2000     Sheet 2 of 2     6,024,048
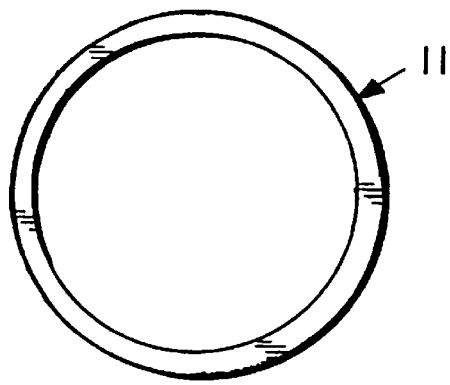
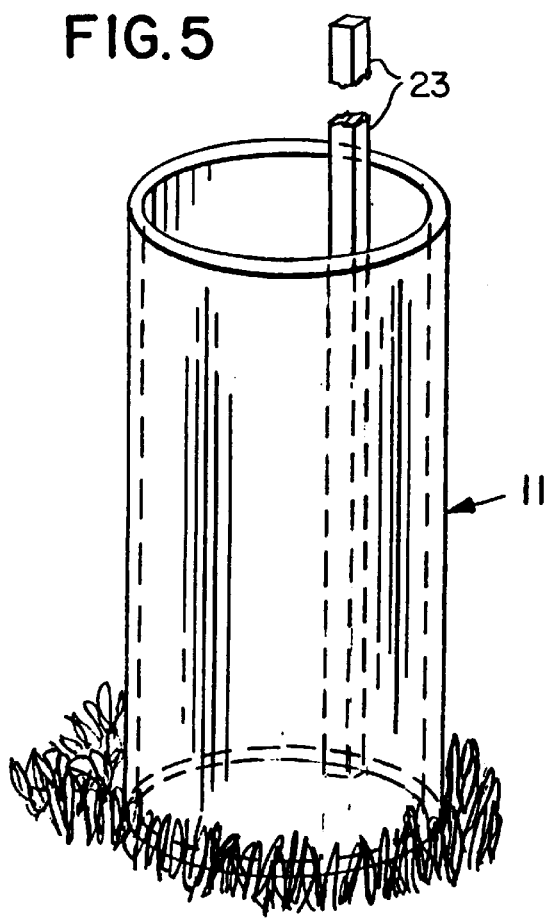
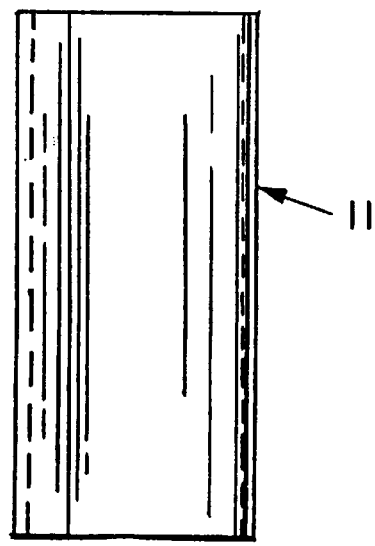

POLE SLEEVE

BACKGROUND OF THE INVENTION

1. Field of the Invention

There exists a need to guard against animals such as raccoons that are able to climb wooden, metal, and plastic poles to gain access to bird feeders, nesting boxes and the roots, leaves, flowers, fruit, and seeds of elevated garden plants. This invention relates to a device, which creates a barrier to such arboreal animals and thus prevents them from traveling to structures atop poles and posts that are to be protected.

2. Description of the Prior Art

The need to prevent animals from climbing is well known and has been dealt with in an array of fashions. Chester sought to squirrel-proof a pole in U.S. Pat. No. 4,031,856 by attaching an elongated collar that moves up and down vertically about a pole by means of a counterweight that is provided within the pole. This serves to have the clinging squirrel drop vertically along with the collar by the principle of gravity. While this mechanical system may serve that purpose it relies on ropes pulleys, and a sliding counterweight that makes this system vulnerable to snags and wear. Fisher proposes a conical shaped barrier in his U.S. Pat. No. 4,389,975 that affixes to the underside of a bird feeder. While the barrier may be protective animals are still able to climb up the pole somewhat approaching the proximity of the structure to be protected. And finally Danca demonstrates a system of telescoping casings dangling from suspension chains. This concept relies on a wobbling, clanging disruption to achieve its end.

BRIEF SUMMARY OF THE INVENTION

It is an object of this invention to provide a device which deters animal such as raccoons and squirrels from climbing a pole and gaining access to a bird nest box or feeder. It is a further object to provide such a device that is of a singular structure and of simple esthetic design.

BRIEF DESCRIPTION OF THE DRAWINGS

In conjunction with the detailed description which follows reference is made to the drawings Wherein:

FIG. 1 is a top view of the device, as it would overlap itself

FIG. 2 is a perspective view of the device

FIG. 3 is a side view of the device, as it would sit upon the ground affixed to a post FIG. 4 is a top view of the device, as it would abut a post FIG. 5 is a perspective view for another embodiment for a seamless pole sleeve.

FIG. 6 is a top plan view thereof; and,

FIG. 7 is a side elevational view thereof.

DETAILED DESCRIPTION OF THE INVENTION

This patent concerns itself with a device 1 as depicted in FIG. 1 that is formed by a flexible sheet that is rolled into a cylindrical shape. The internal stress that is attained from the bending into position becomes an integral force looking to effect recoil of the material back into a sheet. This potential force comes into play when the round cylinder is subject to additional force by external compression. When the device is gripped and pressed the internal forces built into the cylinder react by springing the cylinder back into position thus dislodging any contender such as a climbing animal.

This device 1 may be placed over and secured to an existing pole or post 3 as depicted in FIG. 3. The ends 2 of the material may be overlapped and joined as in FIG. 2 or may merely approximate one another as in FIG. 4 when being affixed to a pole or post 3.

The composition of the material would be such that it is pliable and permits bending into a round cylindrical shape and retains "memory" whereby it is looking to return to its original preformed position. The material would have to be of sufficient strength to provide ample deflective recoil to the animal selected to be repelled.

FIG. 5 shows seamless pole sleeve 11 attached to pole 23.

FIGS. 6 and 7 show top and side elevational view of pole sleeve 11.

It is understood that the invention described is not limited to and may be variously embodied by the following claims.

I claim:

1. Apparatus for guarding a pole supporting a bird feeder, nesting box, or elevated garden plant from animals able to climb said pole to gain access to said bird feeder, nesting box or garden plant comprising, in combination:

a pole supporting a bird feeder, nesting box or elevated garden plant;

a barrier surrounding said pole comprising a flexible sheet rolled into a cylindrical shape having a diameter greater than the thickness of said pole, said sheet being made from material having a memory tending to return to its preformed cylindrical shape and having sufficient strength to provide ample deflective recoil to the animal selected to be repelled; and said sheet resting on the ground affixed to said pole at one location on an inner surface of said flexible sheet with the remaining circumference of said barrier spaced from said pole.

* * * * *